Oct. 28, 1958     F. SCHYTIL     2,857,683
COFFEE ROASTER
Filed May 10, 1954
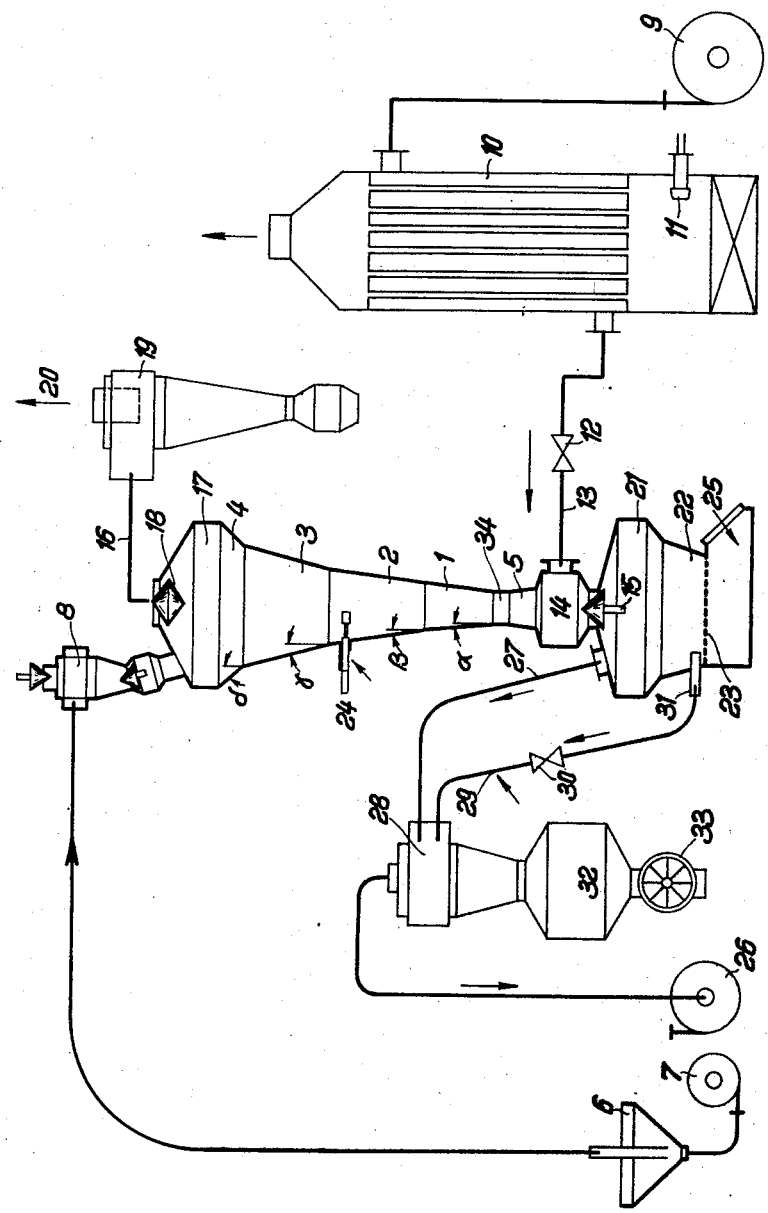
Inventor:
Franz Schytil
By Bailey, Stephens and Huettig
Attorneys United States Patent Office 2,857,683
Patented Oct. 28, 1958

2,857,683

COFFEE ROASTER

Franz Schytil, Frankfurt am Main, Germany, assignor to Metallgesellschaft Aktiengesellschaft, Frankfurt am Main, Germany Application May 10, 1954, Serial No. 428,577

6 Claims. (Cl. 34—57)

This invention relates to the roasting of foods. In particular the invention is directed to the roasting of coffee and nuts and cereals.

Heretofore known apparatus for roasting foods such as coffee, cocoa, peanuts, malt and the like may be roughly classified into four groups. In the oldest process the material is heated in rotating drums. Heating is accomplished either entirely indirectly, or by passing heated air or other inert gas through the material. This process has the disadvantage in that the heating time is very long so that decomposed products are formed which deleteriously affect the taste, and can never be entirely avoided. Furthermore, the material suffers a large loss of weight because of the long heating period, and that loss is disproportionately due to the loss of the most valuable ethereal or aromatic oils.

The second group of roasting processes which was used only for the roasting of coffee accomplished the heating by radiation, especially by the use of infrared rays. Since in this process the heat is generated within the material itself, it is technically very difficult or even impossible to prevent the formation of super-heated cores. It is practically impossible to get an entirely homogeneously roasted product without marks of burning on some of the material. Consequently, it is usual to combine the roasting apparatus with a mill so that the defects will be concealed in the milling of the material. The large use of electrical current is necessary for the generation of the rays, and since a considerable amount of heat is necessary, it is impossible to construct large but economical apparatus.

The third type of roasting apparatus, especially for the roasting of coffee and cocoa, consists of the application of the fluid bed principle. Since such apparatus is based on the use of a grate at the bottom of the apparatus, it is impossible to prevent the material being roasted from contacting the bars of the grate or perforated plate, so that the super-heating of the material cannot be prevented, as the roasting gas introduced has to be heated to much higher temperature than that which is necessary for the roasting. Furthermore, the specific gravity of the coffee beans changes considerably during the roasting process and thus constantly requires the adjustment of the volume of the roasting gas used during the process. Such adjustment causes more operating difficulties.

The fourth type of roasting apparatus is composed of shelves on which the material to be roasted lays, and through which is passed an upwardly rising heated air stream. Although this apparatus has the advantage of avoiding super-heating of the material, it does not make possible the roasting at relatively high temperatures and therefore is practically used only for the treatment of malt. Furthermore, the apparatus requires considerable space and has a relatively poor output.

The objects of the instant invention are to produce an apparatus and a process for the roasting and cooling of coffee, cocoa, peanuts, malt and the like which has great technical and economical advantages over the aforesaid former types, and yet avoids the disadvantages thereof.

In general, the objects are obtained by employing an essentially modified form of the fluidized bed process. The fluidizing phase is maintained in a roatser having an upwardly enlarged cross section, by means of which the differences occurring in the specific gravity of the material being roasted are automatically compensated for. The widening angle of the roaster gives it a Venturi shape and consequently the material being roasted is kept in suspension with as small as possible contact with the heated walls of the roaster. The use of a grate causing super-heat is not necessary. The roaster has a slender shape and permits a very fast dumping of the material after it has been roasted, thus enabling the exact stopping of even a very short roasting time. Furthermore, it makes it possible to transfer the roasting material to a cooling process also operated on the principle of the fluid bed process. The cooling can be accomplished so quickly that the pores of the roasted material close much faster than heretofore possible, and is of special advantage in the roasting of coffee and cocoa inasmuch as the aromatic components are sealed in to a much greater degree than by any process heretofore known. Furthermore, because of the extremely short roasting time employed, no cracking of the material occurs and the output of the roaster is at a better quality, from 3 to 5% higher than with other processes.

According to the instant invention, the roasting material is entirely homogeneously roasted and has not lost a significant amount of component substances, has no bad tasting cracking products, and has a greater percent of the aromatic components sealed in the material so tightly that the aroma does not escape even though the material is stock piled for a considerable time.

The apparatus and process by means of which the objects of the invention are obtained are described more fully with respect to the accompanying schematic drawing showing the apparatus as used in the roasting of coffee.

The roaster is composed of superimposed sections 1, 2, 3 and 4 which have upwardly diverging walls as sections of cones of different size. At the bottom of the roaster is a section 5 having upwardly converging walls, and connected to the lowermost section 1 by means of a neck portion 34. Thus, the roaster is in the form of a Venturi tube. It is very important to choose the correct angle alpha for the divergence of the walls of section 1 from the vertical. If this angle is too small, the motion of the coffee beans will be too violent, and thus produce a grinding effect among the beans. If on the contrary this angle is too large, the gas stream will not be equally dispersed over the cross section so that the slowly moving beans would stick to the wall of section 1 and become burned. It has been determined that this will always happen if the angle is smaller or larger than from 3° to 12°. It often happens when the angle is not between 5° to 7°. Therefore, the angle alpha is preferably 6°.

The walls of sections 2, 3 and 4 have the diverging widening angles beta, sigma and delta, respectively, and are superimposed upon section 1. The selection of these angles is not limited up to a certain degree, but the largest angle delta shall not exceed 45° or otherwise there will be again the danger that the coffee beans will stick to the wall and be burned. The angles are in such proportion to the height of the individual sections that the total volume within the roaster has a certain proportion with respect to the quantity of coffee in the roaster. It has been determined that the volume of the roaster should be from 5 to 15 liters, especially 10 liters per kg. of coffee is optimum.

The coffee beans are pneumatically carried from hopper 6 connected with blower 7 to the cyclone shaped upper hopper 8 having a double cone valve mechanism.

The roasting air is supplied by means of a blower 9, the air being passed through a heat exchanger 10, heated by burner 11, the air being heated to the required temperature and then conveyed through valve 12 in pipe 13 to the air mixing chamber 14 beneath inlet nozzle section 5. Chamber 14 has a conical valve 15 in the bottom thereof.

The roasting gas passes upwardly through sections 1 to 4 and is exhausted through the top of the roaster through pipe 16 after the gas has passed through a velocity diminishing or brake zone 17. A bevel or impact body 18 is mounted in the top of the roaster for preventing upwardly blown beans from being carried away with the exhaust gas. The green skins or outer membranes of the beans which have fallen off the beans while they are being roasted are carried along with the air and are separated and removed in the cyclone separator 19. Gas exhausted from a cyclone 20 may be treated by any known means for the manufacture of caffeine, and for the recovery of heat therefrom. During the roasting process samples can be extracted through port 24 in roaster section 2. It is apparent that beans dumped into the upper portion of the roaster fall downward until they are held in suspension by the gas rising upwardly through chamber 14 and nozzle section 5, and that these beans will locate themselves in the roasting chamber in accordance with their respective specific gravities, and will relocate themselves as their specific gravities change during roasting.

Beneath chamber 15 is a part of the cooling apparatus. It is composed of a slightly enlarged fluidized bed section 22 which has its bottom closed by a grate or perforated plate 23. Above section 22 is a velocity reducing or braking section 21. Cooling gas enters opening 25 beneath grate 23 by means of suction created by fan 26 which communicates with the cooling chamber 22 through pipe 27 and cyclone container 28. A second pipe 29 provided with valve 30 also communicates between cyclone chamber 28 and by means of pipe 31 with the lower portion of chamber 22 containing the fluidized bed. By opening valve 30 it is possible to pull out the material in chamber 22 by suction after the end of the cooling process and convey it into the cyclone chamber 28, and then dump it into bin 32. This bin is emptied by means of a bucket wheel 33, the charge being dumped into any suitable transporting device, not shown.

The roasting time depends upon the temperature of the roasting gas and also upon the grade of roasting desired. If a medium roasting temperature of 220° C. is maintained, and any common coffee bean mixture is roasted for about 100 seconds, a roasted product is obtained which meets the average German taste. If the roasting time is increased to from about 105 to 110 seconds, darker and more oily brands are obtained as are preferred in France and Italy. If the roasting time is shortened to about 95 seconds, a higher quality of roasted beans is obtained such as preferred in the U. S. A. Roasting periods of from 90 to 110 seconds are therefore generally sufficient. It is, of course, also possible to roast coffee at temperatures other than 220° C. However, it is not practical to go below about 170° C. or above 280° C. and temperatures from 210° to 220° are preferred. At this latter higher temperature it will be quite difficult to check the precise roasting time. The roasting temperatures referred to are those average temperatures which will exist in section 2 of the roaster. This temperature changes during the roasting period by falling from an originally high temperature to a minimum, and then rising again at the end of the process. The temperatures given above relate to the temporary and local average values occurring in section 2.

The quantity of roasting air required depends upon two different facts. First upon the velocity of the air stream in the neck or throat 34 of the Venturi tube should be at least 25 to 30 meters per second relative to zero degrees and 760 mm. mercury gauge. If the velocity drops below this value a free floating fluid suspension cannot be maintained so that the advantage of a roasting process without a grate would no longer exist. If, on the contrary, the velocity is much above this value, a grinding action will take place among the beans.

Furthermore, there must be such an amount of air that its utilizable or extractable heat, while the air is passing through the roaster, is sufficient for carrying out the roasting of the beans. It was found that generally 180 to 200 kg. calories are needed for 1 kg. of crude coffee beans.

After the beans have been roasted, the roasting air is stopped by closing valve 12, and then conical valve 15 is opened to dump the beans into cooling section 22. At the same time, exhaust blower 26 is producing a lower pressure in section 22. Thus, due to gravity and suction fan 26, the roasting coffee beans drop into cooling section 22 in the shortest possible time. In this section the beans are held in a fluidized layer by the air incoming through opening 25 and passing through grate 23. In the process being described the incoming air had a temperature of 20° and the beans were cooled within 90 seconds down to 25° C., utilizing 300 m.$^3$ of cooling air per 1 kg. of coffee beans. It is therefore possible to equalize the times required for both the roasting of the beans and the cooling thereof. In other words, while one charge of beans is being roasted, a previously roasted charge is being cooled during the same approximate time so that the apparatus can be in substantially constant operation.

Valves 12, 15 and 30, as well as the conical valve in hopper 8, may be operated automatically by known means. Such automatic operation is preferably used since both the roasting and the cooling steps are completed within fixed periods of time provided that neither the degree or amount, nor the temperature of both the roasting and the cooling air are changed.

The foregoing description of the apparatus and process includes a large number of details which, while being useful, are not absolutely necessary. Thus, it is possible to construct the roaster of more or less than the four sections shown, each having a different widening angle, or using a single element having an upwardly progressively enlarged widening angle. Moreover, the control valve 15, as well as the other shutting valves, may be substituted by other suitable valve means. The intake roasting air may be electrically heated rather than by using the burner shown. Furthermore, the cyclone separator 19 is not needed if no further treatment is to be made of the exhausted roasting gas. Any dumping means can be substituted for the bucket wheel 33, and means can be provided for conditioning either or both of the cooling and roasting airs by cleaning, moistening, or drying the same.

Having now described the means by which the objects of the invention are obtained,

I claim:

1. An apparatus for the fluid bed roasting or heat treatment of foods while said foods are free floatingly suspended in a hot gas comprising a vertical roaster having walls upwardly diverging from the vertical by angles ranging from 3° to 12°, preferably from 5° to 7° at the lowest portions of said walls, a vertical venturi-shaped bottom gas inlet section, a gas mixing chamber beneath and of greater diameter than said bottom gas inlet section, means for introducing food suspending gas into said chamber for giving the gas a rising upwardly swirling movement through said gas inlet section, a topmost velocity reducing section, means for introducing food into said roaster through said topmost section, and means for withdrawing treated food through said gas inlet section.

2. An apparatus as in claim 1, said roaster further comprising a plurality of superimposed sections with each having walls outwardly diverging at an angle greater than the next lower section to form a roaster having a volume of from 5 to 15 liters per 1 kg. of the food charge, and the maximum of said angles being 45°.

3. An apparatus as in claim 2, further comprising a cooling section beneath said gas inlet section, and means for suspending the treated food in an air stream in said cooling section and for assisting in the discharge of the food charge from the roaster into said cooling section.

4. An apparatus as in claim 3, further comprising a cooling velocity retarding section between said cooling section and said gas inlet section.

5. An apparatus as in claim 4, further comprising a cyclone, and air pipe means interconnecting said cooling section and said cyclone.

6. an apparatus as in claim 5, said pipe means further comprising a first pipe for exhausting cooling air from said cooling section, and a second pipe for sucking cooled food from said cooling section.

References Cited in the file of this patent
UNITED STATES PATENTS

| | | |
|---|---|---|
| 790,162 | Trump | May 16, 1905 |
| 2,054,441 | Peebles | Sept. 15, 1936 |
| 2,105,778 | Behr et al. | Jan. 18, 1938 |
| 2,212,120 | Kneale et al. | Aug. 20, 1940 |
| 2,348,066 | Goldfine | May 2, 1944 |
| 2,497,501 | Himmel et al. | Feb. 14, 1950 |
| 2,659,587 | Bowen | Nov. 17, 1953 |